US008347655B2

(12) United States Patent
Leister et al.

(10) Patent No.: US 8,347,655 B2
(45) Date of Patent: Jan. 8, 2013

(54) METHOD AND SYSTEM FOR PRODUCING GLASS, IN WHICH CHEMICAL REDUCTION OF GLASS COMPONENTS IS AVOIDED

(75) Inventors: Michael Leister, Ingelheim (DE); Uwe Kolberg, Mainz (DE); Simone Monika Ritter, Mainz (DE); Silke Wolff, Hueckeswagen (DE)

(73) Assignee: Schott AG, Mainz (DE)

( * ) Notice: Subject to any disclaimer, the term of this patent is extended or adjusted under 35 U.S.C. 154(b) by 287 days.

(21) Appl. No.: 12/813,652

(22) Filed: Jun. 11, 2010

(65) Prior Publication Data

US 2010/0242543 A1   Sep. 30, 2010

Related U.S. Application Data

(62) Division of application No. 11/835,689, filed on Aug. 8, 2007.

(30) Foreign Application Priority Data

Aug. 12, 2006  (DE) .......................... 10 2006 037 828
Feb. 16, 2007  (DE) .......................... 10 2007 008 299

(51) Int. Cl.
C03B 5/44 (2006.01)
C03B 5/193 (2006.01)
C03B 5/02 (2006.01)
(52) U.S. Cl. ........ 65/347; 65/134.4; 65/134.5; 65/135.6
(58) Field of Classification Search .................. 65/134.4, 65/134.5, 135.6–135.8, 346, 347
See application file for complete search history.

(56) References Cited

U.S. PATENT DOCUMENTS

| 2,252,756 | A | * | 8/1941 | Byers ............................... 65/196 |
| 2,331,052 | A | * | 10/1943 | Shadduck ..................... 65/134.4 |
| 3,875,322 | A | * | 4/1975 | Sundberg ....................... 373/152 |
| 4,019,888 | A | * | 4/1977 | Verhappen et al. ........... 65/134.5 |
| 4,600,425 | A | * | 7/1986 | Krumwiede et al. ........... 65/178 |
| 4,634,461 | A | * | 1/1987 | Demarest et al. ................. 65/27 |
| 4,882,736 | A |   | 11/1989 | Pieper |
| 4,929,266 | A | * | 5/1990 | Cozac et al. ................. 65/134.5 |
| 6,185,243 | B1 | * | 2/2001 | Boen et al. ..................... 373/156 |
| 6,588,234 | B1 | * | 7/2003 | Kiefer et al. ................. 65/134.3 |
| 6,751,989 | B1 | * | 6/2004 | Schmidbauer et al. ......... 65/347 |
| 6,810,689 | B2 | * | 11/2004 | Romer et al. ................. 65/134.1 |
| 6,854,291 | B2 | * | 2/2005 | Romer et al. ................. 65/134.5 |
| 6,871,514 | B2 | * | 3/2005 | Muschik et al. ............... 65/33.9 |
| 6,912,874 | B2 | * | 7/2005 | Kunert et al. ................... 65/356 |
| 7,010,940 | B2 | * | 3/2006 | Ogino et al. ................. 65/135.9 |
| 7,191,619 | B2 | * | 3/2007 | Ogino et al. ..................... 65/347 |
| 7,296,441 | B2 | * | 11/2007 | Leister et al. ................. 65/135.2 |
| 7,383,698 | B2 | * | 6/2008 | Ichinose et al. ............... 65/134.1 |
| 7,454,925 | B2 | * | 11/2008 | DeAngelis et al. ............. 65/324 |

(Continued)

Primary Examiner — Jason L. Lazorcik
(74) Attorney, Agent, or Firm — Michael J. Striker

(57) ABSTRACT

In the apparatus for producing glass reduction of reduction-sensitive components in the glass melt is reduced or preferably is prevented during the melting and/or fining processes by introducing an oxidizing agent into the glass melt. The apparatus has a melt crucible, a fining vessel, and a device for conducting oxygen and/or ozone into the glass melt in the melt crucible and/or fining vessel, in order to suppress reduction of reduction-sensitive components of the glass melt. A preferred embodiment of the apparatus has a metallic skull crucible, which includes the melt crucible and/or the fining vessel. The apparatus preferably includes a homogenization unit connected to the fining vessel to receive glass melt from the fining vessel in order to further process the glass melt after refining.

14 Claims, 2 Drawing Sheets

U.S. PATENT DOCUMENTS

| | | | |
|---|---|---|---|
| 7,584,632 B2 * | 9/2009 | House et al. | 65/134.5 |
| 7,694,533 B2 * | 4/2010 | Rodek et al. | 65/135.6 |
| 7,730,744 B2 * | 6/2010 | Ogino et al. | 65/134.5 |
| 7,823,416 B2 * | 11/2010 | Aoki et al. | 65/134.5 |
| 2002/0023465 A1 | 2/2002 | Ogino et al. | |
| 2002/0035855 A1 * | 3/2002 | Romer et al. | 65/134.4 |
| 2002/0092325 A1 * | 7/2002 | Muschik et al. | 65/134.3 |
| 2002/0121113 A1 * | 9/2002 | Gohlke et al. | 65/134.4 |

* cited by examiner

METHOD AND SYSTEM FOR PRODUCING GLASS, IN WHICH CHEMICAL REDUCTION OF GLASS COMPONENTS IS AVOIDED

CROSS-REFERENCE

This is a divisional, filed under 35 U.S.C. 120, of U.S. patent application Ser. No. 11/835,689, which was filed Aug. 8, 2007 in the U.S.A. The subject matter of this divisional application is also disclosed, at least in part, in German Patent Application DE 10 2006 037 828.8, which was filed in Germany on Aug. 12, 2006, and in DE 10 2007 008 299.3-45, which was filed in Germany on Feb. 16, 2007. The subject matter of the foregoing German Patent Applications, which provide the basis for a claim of priority of invention under 35 U.S.C. 119 (a) to (d), is hereby incorporated herein by explicit reference thereto.

BACKGROUND OF THE INVENTION

1. The Field of the Invention

The present invention relates to a method and an apparatus for producing glass, in which the reduction of reduction-sensitive components of the glass is decreased and preferably is avoided during the melting and fining process. The glass is preferably glass with a high refractive index. According to the invention the term "reduction-sensitive" means sensitivity to both reduction and oxidation reactions, i.e. "reduction-sensitive" also means "redox-sensitive".

2. The Description of the Related Art

Many high-index materials and glass, especially those used for optical, fiber-optic and display-applications as well as for applications for protection and passivation of electronic parts and components, are composed so that the melt technical production leads to a considerable loss of performance in conventional systems and facilities concerning very important properties for the particular application such as transmission, refractive index position, uniformity, electrical resistance and compressibility, thus rendering the production uneconomical.

Such materials and glass compositions comprise components that are reduction sensitive and/or corrosive in the molten state. Reduction sensitive, so-called polyvalent, components can have different redox states (oxidation states) in the melt. The equation for the redox equilibrium of such a component is:

wherein $M^{(x+n)+}$ is the oxidized form and $M^{x+}$ the reduced form of the species M. The redox partners are usually oxygen ions ($O^{2-}$) present in the melt and oxygen dissolved in the melt ($O_2$).

For this redox equilibrium and under the precondition that the oxygen anion concentration is constant ($O^{2-}$=const.) the equilibrium constant K is given by equation (1):

$$K=([M^{x+}]\cdot[O_2]^{n/4})/([M^{(x+n)+}]) \qquad (1).$$

From equation (1) and equation (2), $\Delta H-T^*\Delta S=-RT^*\ln K$, the following dependency of the redox equilibrium concentration ratio $[M^{(x+n)+}]/[M^{x+}]$, [Ox]/[Red], respectively, on the temperature T and on the oxygen concentration $[O_2]$ results:

$$\ln([M^{(x+n)+}]/[M^{x+}])=\Delta H/(R\cdot T)-\Delta S/R+(n/4)\cdot\ln[O_2] \qquad (3)$$

wherein $\Delta H$=enthalpy of the reaction, $\Delta S$=entropy of the reaction, R=specific gas constant.

The outcome of this is that the redox equilibrium is shifted towards the reduced species $M^{x+}$, if the temperature T rises and/or the oxygen concentration $[O_2]$ decreases.

With decreasing temperature T and/or rising oxygen concentration $[O_2]$ the redox equilibrium is shifted towards the oxidized species $M^{(x+n)+}$.

The redox relationship of the oxidized form and reduced form of a component at a distinct temperature and a distinct oxygen concentration is finally determined by the composition of the melt, the substance and matrix specific thermodynamic variables ($\Delta H$ and $\Delta S$) and the possible redox reactions with other polyvalent components. For example in a melt of the composition (% by weight): 8.8% $Na_2O$; 29.6% SrO; 61.1% $P_2O_5$ and 0.5% $SnO_2$ at 1200° C. and with an oxygen partial pressure of 0.21 bar (this is the partial pressure in the atmosphere) about 94% of the tin are present in the form of $Sn^{4+}$ (oxidized form), whereas only 6% are present in the form of $Sn^{2+}$ (reduced form). If the temperature is increased to 1500° C. (at unchanged oxygen concentration i.e. unchanged partial pressure), the redox relationship is changed. In that case the thermodynamic equilibrium shifts so that 47% of the tin are present as $Sn^{4+}$ (oxidized form), 50% are present as $Sn^{2+}$ (reduced form) and already 3% are present as elemental metallic tin. If the oxygen concentration is elevated i.e. the partial pressure is increased to 1 bar at 1500° C., 57.5% of the tin are present as $Sn^+$ (oxidized form), 41% are present as $Sn^{2+}$ (reduced form) and only 1.5% are present as elemental metallic tin. The phosphate ions in this melt underlie the thermodynamic redox equilibrium, too. At 1200° C. and an oxygen partial pressure of 0.21 bar (this is the partial pressure in the atmosphere) about 99.9% of the phosphorus are present as $P^{5+}$ (oxidized form) and only 0.1% as $P^{3+}$ (reduced form). At a temperature of 1500° C. and reducing conditions, for example at an oxygen partial pressure of $10^{-5}$ bar, about 89% of the phosphorous are present in the form of $P^{5+}$ (oxidized form), but already 11% are present as $P^{3+}$ (reduced form) and 0.1% are even present as elemental phosphorous (source: "Das Redoxverhalten polyvalenter Elemente in Phosphatschmelzen und Phosphatgläsern", Dissertation Annegret Matthai, Jena 1999).

Critical for the product properties of materials to be produced are, in connection with the reduction of the components in the materials, a direct effect (decrease) on the optical transmission values due to the reduced species themselves on the one hand and an indirect effect (decrease) on the optical transmission values due to reaction of reduced species with container materials. Furthermore important properties of the materials, such as electrical resistance and the dielectric strength, are influenced negatively, but the reduced species or their corrosion products also influence the crystallization and molding properties.

The reducible species will directly influence the transmission properties if these materials are not present in their highest possible oxidation state. High oxidation states normally have electron configurations that forbid electron transitions due to absorption of light in the visible spectral region, which influences the optical transmission of the material. But in case these components are present in lower oxidation states, electron configurations may occur that allow electron transitions. These lead to absorption of light in the visible spectral region and, thus, to discoloration. Such so-called polyvalent components are, for example: niobium, phosphorous, vanadium, titanium, tin, molybdenum, tungsten, lead and bismuth.

If these components are further reduced thermally or chemically, they can have an oxidation state of 0 and, hence, be present in elemental form. Precipitation of particles and/or crystals in the nanometer range occurs. This leads under the influence of light to diffraction and scattering effects in the material that influence the transmission in the visible spectral range, too. But other properties like the electrical resistance, the dielectric strength and the crystallization properties can also be influenced.

If the precipitated particles or crystals grow, tension and defects occur in the material that can during irradiation with high energy-densities (for example: lasers) lead to destruction of the glass. As described in DE 101 38 109 A1 such particles must be oxidized again through elaborate processes, for example using highly toxic gaseous chlorine, in order to ameliorate the optical properties of the glass after the melting process. The addition of nitrates in the glass batch that provides for strongly oxidizing conditions in the melt by liberation of $NO_2$ and other nitrous gases has to be rejected based on environmental and working security grounds. The described process is also highly dangerous in connection with free phosphate ($P_2O_5$), because it can lead to explosive reactions.

Components that can thermally and/or chemically be reduced to the elemental state in the melt are for example phosphorous, tin, germanium, lead, arsenic, antimony, molybdenum, bismuth, silver, copper, platinum metals and gold.

If there is an affinity or a tendency towards alloy formation between the components reduced in the melt and the container material, the reduced components alloy with the container material and are thus continuously extracted from the melt by chemical equilibrium, the formation of which would lead to an abating of the reaction. So a cycle is set up that in the end leads to a destruction of the crucible, because of the alloy formation the resistance and the melting point of the crucible materials is strongly decreased. This is especially critical in case of crucibles of the platinum group. For example, the alloying of 5% phosphorous with platinum leads to a decrease in melting point from 1770° C. to 588° C. with the resulting effects on the durability of the crucible.

In a less dramatic case the in situ formed alloy is at once dissolved in the melt and a large amount of crucible material is introduced into the melt occurs. In the case of platinum elements this is connected with a discoloration and a worsening of the transmission properties.

It is especially critical in order to achieve high refractive indexes of $n_d > 1.7$, preferably $n_d > 1.75$, and/or minimum possible softening temperatures that are of great importance for precision and precise pressing, that high amounts of reducible compounds are introduced into the materials and glasses.

The use of so-called flameproof materials having an oxidic or oxidic-ceramic basis, for example, zirconium, silicate, or aluminium oxide material, only solves a part of the above-described problems and is additionally not an economically reasonable solution, either. These materials are indeed not reducing, do not show any alloy forming tendencies towards elemental precipitations and are relatively stable toward many melt compositions as far as corrosion and dwell time are concerned. But when they are attacked by the melt they dissolve in part and are "bad-natured", that is these flameproof materials can lead to faults in the glass.

Especially aggressive attack of high-index melt compositions that should additionally be workable by precise pressing is not acceptable, because the dissolution of the crucible and the entry of the material into the melt lead to unwanted changes in properties of the materials and glasses, especially an increase in the transformation temperature, changes in viscosity properties, changes in refractive index and Abbe number as well as changes in transmission. Furthermore areas are formed that are enriched with the flameproof material, which become visible because of striae and refractive index changes in the material.

As a further effect of the strong aggressive attack on flameproof materials, apart from the considerable worsening of properties and uniformity of the glass, an in part extreme shortening of the dwell time of the melt equipment arises causing extensive costs. On the one hand costs arise because of the need to renew the melt unit and on the other hand because of repeated downtime costs.

The continuous melting and fining of corrosive materials and glass in systems with cooled walls on which the material freezes and forms a contact area of specific material is well known for many technical and optical glasses and patented, too (DE 102 44 807 A1, DE 199 39 779 A1, DE 101 33 469 A1). The container, in which the melt is heated and in which the fining process takes place, usually comprises meander-shaped cooling circuits and usually high-frequency radiation is used for the heating of the melt. The forming boundary layer of specific material to a large extent prevents the attack of the melt on the wall material. Hence no contamination of the melt from wall material takes place. All these inventions claim, inter alia, the melting and in part the fining of corrosive, optical glasses of high purity in these so-called skull-devices. Because of the high reduction potential and the comparatively high temperatures that are needed for injection and melting of high-index melts, especially in the niobium oxide/phosphorous oxide system, none of the cited documents offers the potential to produce the claimed glasses in the necessary quality and with the necessary properties.

SUMMARY OF THE INVENTION

It is an object of the present invention is to provide an apparatus for performing a process for producing glass, in which the reduction of reduction-sensitive components of the glass is decreased and preferably avoided. Especially the glass produced in the apparatus has a high refractive index, for example heavy metal-phosphate glasses, heavy metal-borate glasses or heavy metal-silicate glasses.

According to the present invention this is achieved by introducing or injecting oxidizing agents into the fining vessel and preferably into the melt crucible, too. Preferably the oxidizing agents are oxygen and/or ozone. Accordingly the apparatus is provided with a means for conducting the oxidizing agents into the fining vessel and optionally into the melt crucible.

In the process performed in the apparatus according to the present invention preferably melting as well as fining processes take place in melt vessels that are cooled using cooling agents.

Surprisingly it has been discovered that the melting process of reduction-sensitive, high-index materials and glass is well controllable at the high temperatures needed for the process, if the oxidation state of the melt is held within the strongly oxidizing range through a permanent increase of the oxygen concentration from the beginning and the melt itself has no contact with the vessel walls of the melt crucible. This is achieved by cooling the vessel walls with a cooling agent, so that a solidified crust (skull) of specific material is formed. Because of the use of oxygen and/or ozone for bubbling during the whole process, it is possible to avoid using highly toxic oxidizing agents such as chlorine, fluorine or nitrogen dioxide from applied nitrates.

In the case of reduction-sensitive glass bubbling with oxygen and/or ozone has also proven helpful in the conditioning zone, in order to further improve the transmission values.

Energy is introduced into the melt according to its electrical resistance either directly conductively via electrodes or directly inductively via high-frequency radiation.

In the case of heating the melt with electrodes, the electrodes must be cooled intensively, in order to minimize the aggressive attack of the melt on the electrodes. Highly conductive, corrosion-resistant and not-reducing materials like tin oxide, gold or platinum metals (especially platinum and iridium) are used as the electrode material.

In the case of heating with high-frequency radiation the melt crucibles that are cooled by cooling agents must be constructed such that they are permeable to high-frequency electromagnetic alternating fields.

The threshold between these two possible heating methods occurs at a specific electrical resistance value $\rho$ of the melt of ca. 10 $\Omega \cdot$cm at the correspondingly necessary process temperature. This value can to some extent vary according to the respective system and circumstances and, hence, is more a threshold range than a fixed threshold.

The melt crucible preferably consists of (in case of high-frequency heating usually slit) walls that are cooled by a cooling agent and a (in case of high-frequency heating usually slit) bottom also cooled by a cooling agent. A material having high thermal conductivity is used for the walls. Preferably metals or metal alloys are used for that purpose. These can be coated or uncoated. A preferred embodiment of the crucible walls consists of an aluminium alloy. Further embodiments of the crucible walls consist of nickel-based alloys, copper, brass, noble metals or high quality steels. Coatings can consist of fluorine-containing synthetic material or of different metals.

Preferably the melt is heated with a high-frequency electromagnetic alternating field directly inductively during operation. The conductive electrical heating via electrodes is only used, if the electrical conductivity at the highest acceptable melting temperature is not sufficient for a direct high-frequency heating of the melt. A heating of the melt with radiant heaters, electrically or in the form of a burner running with fossil fuels, is also possible. For the starting process (for example the injection of the crucible content into the electromagnetic alternating field) an additional heater is preferably used in the form of a fossil fuel burner.

The oxygen partial pressure is maintained by bubbling oxygen and/or ozone through the crucible bottom and, thus, highly oxidizing conditions are set up throughout the entire melt volume. The bubbling gas can be input to the melt via conventional bubbling nozzles arranged at specific locations in the melt vessel or by foamed, porous or perforated cooled structures that provide a laminar flow of bubbling gas. These conditions prevent on the one hand the reduction of individual melt components, especially of phosphates or of $P_2O_5$ and of polyvalent heavy metal oxides in lower valence states, color-imparting or even metallic color-imparting and alloying species. On the other hand oxidation of all polyvalent species occurs (also the fining agents). Because of the formation of the specific skull-crust aggressive attack on the melt crucible is prevented and, hence, no crucible material is introduced into the melt. Especially the content of highly corrosive $P_2O_5$ in the glass batch can thus be nearly arbitrarily large. The advantage of (so-called "free") $P_2O_5$ lies in the high purities achievable therewith. In contrast to highly pure so-called "free" phosphate ($P_2O_5$) "bound" phosphates always show a high degree of impurities because of their production process.

The melt is afterwards transferred from the melt crucible into a fining vessel.

In a special embodiment this can be done by a directly heated connection pipe made of high quality steel (for example if the melt shall be completely free of silicate) that has a minimum possible length (not longer than 500 mm) or by an indirectly heated connection pipe made of silica glass or ceramic (for example if the melt shall be completely free of noble metals). The advantages of this system are the thermal and/or fluidic decoupling of the melt volume and fining volume, the outstanding controllability and the temperature inspection of the melt stream.

In another embodiment the melt is transferred from the melt crucible into the fining vessel via a short (not longer than 300 mm)—in the actual operation un-cooled—segment with cooled walls. In order to start the process the melt in this segment is heated with a radiant heater (in the form of a fossil fuel burner or electrically). The advantage of this system is the complete separation of the whole high-temperature part of the system from the components underlying corrosion, and hence the nearly absolute prevention of the entry of foreign matter into the melt.

The fining vessel like the melt crucible preferably consists of (in case of high-frequency heating usually slit) walls and a bottom that are cooled by a cooling agent. These likewise preferably consist of metal or a metal alloy. It can be coated or uncoated. A preferred embodiment of the vessel walls consists of an aluminium alloy. Further embodiments are however vessels made of nickel-based alloys, copper, brass, noble metals or steels. Coatings can consist of fluorine-containing synthetic materials or other materials. Preferably the melt is heated directly inductively via a high-frequency electromagnetic field during operation. A conductive electrical heating via electrodes is also possible, but is only applied, if the electrical conductivity at the maximum applicable melting temperature is not sufficient for a direct high-frequency heating of the melt. The heating by radiant heaters, electrical devices or a burner that operates with fossil fuel is also possible. An additional heater in the form of a fossil fuel burner is preferably used for the starting process of introduction of the crucible contents into the electromagnetic alternating field.

The oxygen partial pressure is maintained by bubbling oxygen and/or ozone through the crucible bottom and, thus, highly oxidizing conditions are adjusted throughout the entire melt volume. The bubbling gas can be input to the melt via conventional bubbling nozzles arranged at specific locations in the melt vessel or by foamed, porous or perforated cooled structures that provide a laminar flow of bubbling gas.

This second bubbling step brings the oxygen partial pressure in the melt back to the starting level adjusted in the melt crucible. So, reduction processes are effectively avoided, during the melting process reduced species are oxidized again and a redox buffer for the fining process is established in the melt. The oxygen partial pressure is adjusted such that oxygen liberation from the fining agents (for example As, Sb or Sn) is still possible at the fining temperature, but the reduction of (less noble) glass components is effectively suppressed.

Attention should only be paid to the fact that minimum bubble size of the bubbling gas during this bubbling step has to be chosen sufficiently large (>0.5 mm) so that the bubbles ascend completely in the melt volume and the fining process is not compromised by the entry of small bubbles into the melt volume.

Afterwards, in the fining process happening in the hotter zone of the fining vessel, the chemical fining of the melt takes place by a preferably selective thermal reduction of the fining agent(s), the liberation of oxygen connected thereto and, simultaneously, the physical fining through decrease of the viscosity in the melt.

Preferably the process is conducted so that the heating of the melt stream to the fining temperature is done impulsively and quickly. For that purpose the geometry of the fining zone is selected and the fining zone is provided with melt stream affecting fixtures so that a narrow dwell time spectrum is achieved in the melt volume and the heat input into the melt volume takes place efficiently.

Because of their form the fixtures can force a glass melt stream upwards in the melt and thus assist the ascent of the bubbles. Preferred forms of such fixtures are slit skull segments, cooled by cooling agent. The fixtures may likewise consist of cooled or un-cooled not reducing ceramics and/or noble metals.

After the melt has passed through the hottest zone of the fining vessel and the actual fining is finished, it enters colder zones. In these colder zones on the one hand the adjustment of the exit temperature from the skull system takes place, which is below the temperature at which the corrosion of the following noble metal system begins. If one stays below a distinct temperature dependent on the matching of noble metal alloy and glass composition, no significant corrosion of the vessel wall by the melt takes place. On the other hand the re-sorption of the bubbles formed during the fining process, which are not large enough to ascend and to exit the melting volume, takes place by reduced fining agent species.

The adjustment of the ranges of the different temperatures in skull systems that are cooled with cooling agents takes place through a combination of constructive measures and process conduct.

The power input by the high-frequency radiation into the melt is dependent on the form and geometry of the high-frequency field. The field strength in the melt can be varied and adjusted by the distance and the degree of coverage of the inductor and melt. Thereby the power input by the high-frequency radiation into the melt can be adjusted and varied. This effect can be further strengthened or weakened by further constructive measures like the positioning of the high-frequency short circuit and the thus occurring field displacement.

Extensive bubbling or agitating by a mechanical agitator cooled by a cooling agent produces an intensive turbulent mixing of the melt, which makes the temperatures more uniform and warms zones that are otherwise colder. Without intensive bubbling on the contrary a mostly laminar flow is formed with temperature layers and a stable temperature gradient between intensively cooled interfaces and the hot core zone of the melt or un-cooled interfaces, respectively. According to the high-frequency power radiated into the melt and the adjusted melt throughput a combination of these effects leads to the desired temperature profile in the entire melt system.

After the melt has passed through the colder zones of the fining vessel, it is withdrawn via a noble metal discharge system positioned in the wall or the bottom, which are both cooled by a cooling agent, and then fed to further processing. This sort of withdrawal or discharge system is disclosed in DE 103 29 718.9-45 and can be cooled or not cooled.

Further processing preferably utilizes a homogenization unit and a cooling duct made of a noble metal alloy or of glass. In the homogenization unit, made of silica glass, noble metal or a noble metal alloy, too, active (by means of an agitator) or passive (by fixtures) intensive mixing of the melt takes place, in order to adjust the refractive index uniformity and the striae quality to the necessary level according to the particular requirements. The agitator and the fixtures may consist of noble metals, noble metal alloys, silica glass and/or ceramics.

The cooling duct, as well as the homogenization unit, is directly or indirectly heatable. The cooling duct can at least in part be actively cooled.

The length and geometry of the cooling duct depends on the initial temperature and the final temperature of the melt to be achieved.

In the homogenization unit a direction change of the melt from the horizontal flow direction to a vertical downwards flow direction can take place through a withdrawal opening in the bottom of the vessel. In this case a directly or indirectly heatable feeder system of one or more segments that feeds the melt to the molding facilities is attached. This feeder system consists of noble metal, a noble metal alloy, silica glass or ceramic. Length and diameter of the feeder segment(s) are fitted to the desired feeding volume/time unit.

In the case of especially reduction-sensitive melts it can be advantageous to conduct oxygen and/or ozone through the melt in this already relatively cold and correspondingly high viscosity area of the melt. The advantage of the gas input of oxidizing oxygen and/or ozone at such low temperatures is that the back reaction of the oxidized species to their corresponding reduced form is thermodynamically (because of the low temperatures) and kinetically (because of the high viscosity) strongly suppressed. Hence, the transmission can again be ameliorated critically (see below: melt example A).

In the case of glass for non-optical applications it is not important to pay attention to remaining bubbles in the volume, instead oxygen and/or ozone can be directed into the melt volume, for example, simply using a bubbling lance made of noble metal.

In the case of glass for optical application the volume stream of the bubbling gas is preferably chosen to be smaller than 30 l/h. Nozzle diameter and tearing edge are to be adjusted to the gas throughput such that no turbulent streams are generated in the melt and no small oxygen bubbles (<0.5 mm) are formed that remain in the melt.

With the preferably used skull crucibles the metal pipes are short-circuited in the area of the high-frequency coil. In a special embodiment the metallic walls cooled by a cooling agent consist of platinum or a platinum alloy or of aluminium or an aluminium alloy. In a further embodiment the metallic walls consist of copper, brass or INCONEL® and are coated by a layer of platinum, a platinum alloy or fluorine-containing synthetic material.

The addition of the glass batch of the melt is preferably performed in compacted form and during the melting process it is advantageous if the glass batch is mixed.

Preferred embodiments of the apparatus for performing the process according to the present invention include the melt crucible, the fining vessel and the homogenization unit with the features that are described above.

BRIEF DESCRIPTION OF THE DRAWING

The objects, features and advantages of the invention will now be described in more detail with the aid of the following description of the preferred embodiments, with reference to the accompanying figures in which.

DESCRIPTION OF THE PREFERRED EMBODIMENTS

Figure 1:
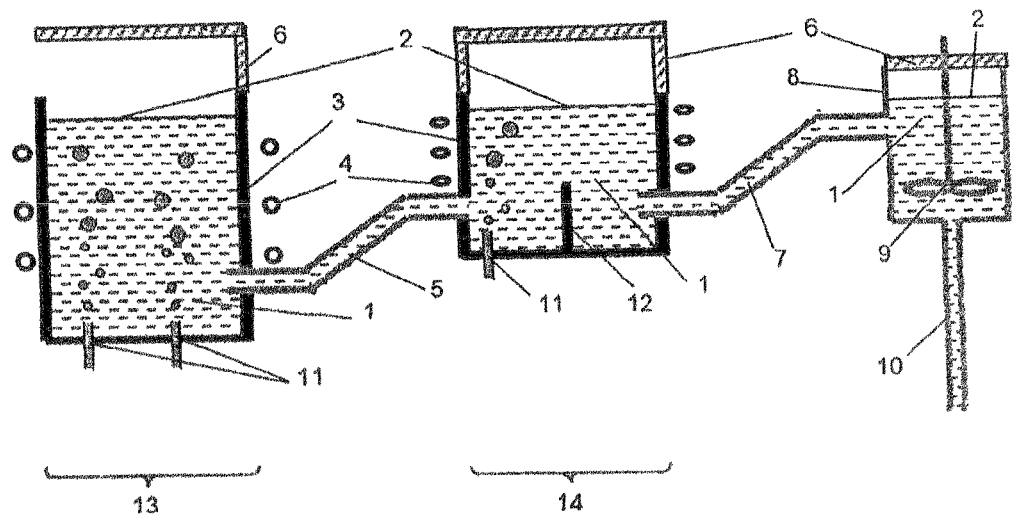
FIG. 1 is a schematic cross-sectional view of a first embodiment of a system according to the invention for producing glass in which chemical reduction of the components of the glass is avoided.

The drawing reference number 1 designates the melt and the drawing reference number 2 designates the glass level in each of the accompanying figures. In the apparatus shown in FIG. 1 a melt crucible 13, which comprises skull walls cooled by a cooling agent 3 and a cover 6 made of flameproof material, is connected via a heatable connection piece 5 made of noble metal or silicate glass to a fining vessel 14, which likewise comprises skull walls cooled by a cooling agent 3 and a cover 6 made of flameproof material. The melt crucible 13 and the fining vessel 14 are both encircled by inductors 4 and comprise bubbling nozzles 11 in a bottom area.

The fining vessel 14 comprises a glass melt flow influencing skull wall 12 in its interior and is connected via a cooling duct 7 made of noble metal or silicate glass to a homogenization unit 8. The homogenization unit 8 made of noble metal or silicate glass comprises a cover 6 made of flameproof material, an agitator 9 made of noble metal or silicate glass and a heatable feeder device 10 made of noble metal or silicate glass.

Figure 2:
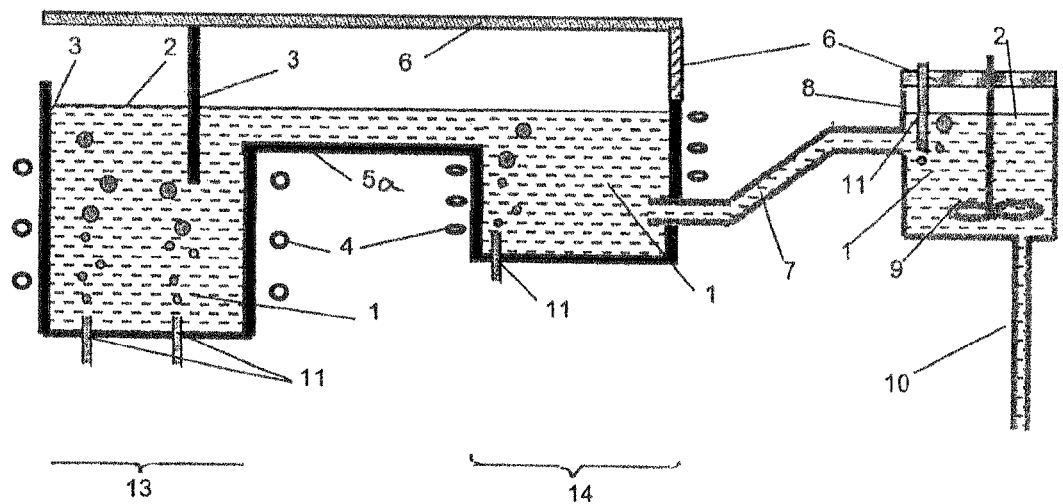
FIG. 2 is a schematic cross-sectional view of a second embodiment of a system according to the invention for producing glass in which chemical reduction of the components of the glass is avoided.

The apparatus shown in FIG. 2 is different from that shown in FIG. 1 in such a way that the melt crucible 13 and the fining vessel 14 are connected to each other via a skull segment 5a. Also homogenisation unit 8 in the embodiment of FIG. 2 comprises a bubbling nozzle 11.

Figure 3:
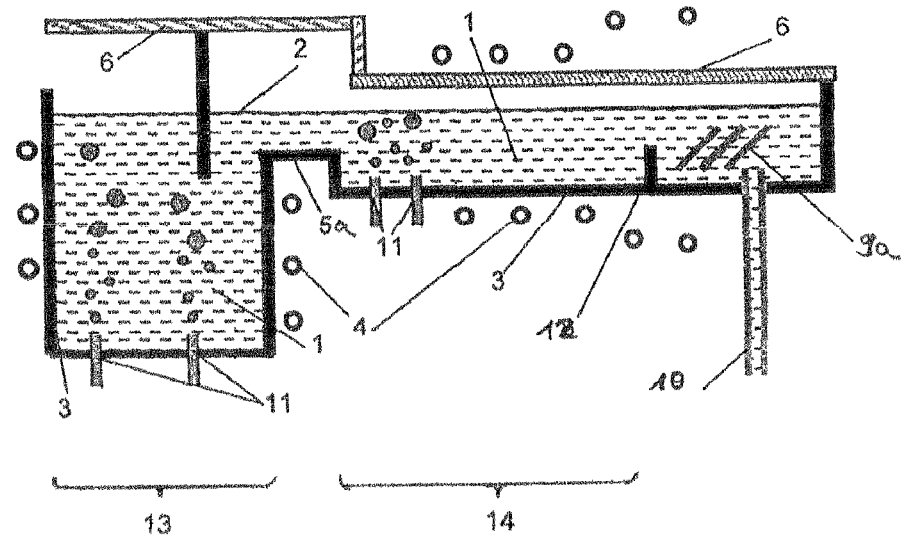
FIG. 3 is a schematic cross-sectional view of a third embodiment of a system according to the invention for producing glass in which chemical reduction of the components of the glass is avoided.

The apparatus shown in FIG. 3 has a further modification in the homogenization unit 8, which is a static homogenization unit 9a instead of an agitator. Furthermore the cooling duct and homogenization unit are formed in one piece.

Figure 4:
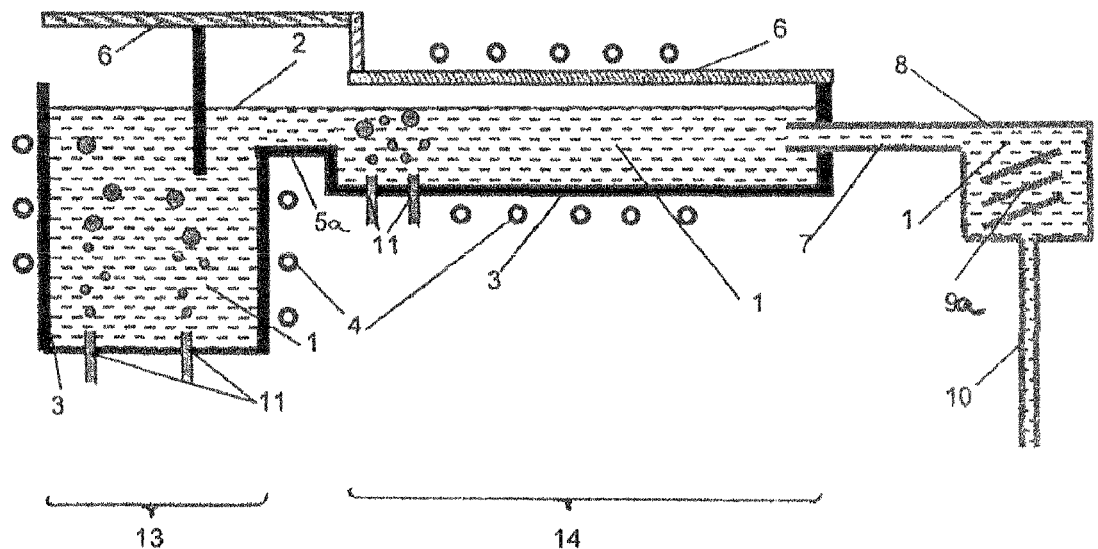
FIG. 4 is a schematic cross-sectional view of a third embodiment of a system according to the invention for producing glass in which chemical reduction of the components of the glass is avoided.

In contrast the cooling duct and the homogenisation unit are not in one piece in the embodiment shown in FIG. 4. The embodiment of the system shown in FIG. 4 has as a connection between the homogenization system 8 and the fining vessel 14 that comprises cooling duct 7, which is made of noble metal or silicate glass.

Instead of the noble metal a noble metal alloy can also be used in every embodiment of the present invention. Instead of the bubbling nozzles 11 in every case foamed, porous or perforated cooled structures can be used, too.

The glass that can be produced using the method according to the present invention preferably comprises the components shown in table I.

TABLE I

| Components for Glass Production | |
|---|---|
| Components | Wt.-% |
| $P_2O_5$, $B_2O_3$, $SiO_2$, F * | 0-50 |
| $Nb_2O_5$, $Ta_2O_5$, $Bi_2O_3$, $Sb_2O_3$, PbO | 0-80 |
| $WO_3$, $MoO_3$ | 0-30 |
| $GeO_2$ | 0-20 |
| MgO, CaO, SrO, BaO | 0-40 |
| $Li_2O$, $Na_2O$, $K_2O$, $Rb_2O$, $Cs_2O$ | 0-12 |
| ZnO, $TiO_2$ | 0-8 |
| Σ $Nb_2O_5$, $Ta_2O_5$, $Bi_2O_3$, $Sb_2O_3$, PbO | 20-80 |

TABLE I-continued

| Components for Glass Production | |
|---|---|
| Components | Wt.-% |
| Σ $WO_3$, $MoO_3$, $GeO_2$ | 0-40 |
| Σ alkali metal oxide | 0-15 |
| Σ alkaline earth metal oxide | 0-30 |

Here and in the following tables and enumerations, the enumeration of multiple components means that these components can be incorporated into the composition each independently in the indicated range.

The glasses that can be produced using the method according to the present invention particularly preferably comprise the compounds shown in table II.

TABLE II

| Components for Glass Production | |
|---|---|
| Components | Wt.-% |
| $P_2O_5$, $B_2O_3$, $SiO_2$, F | 0-30 |
| $Nb_2O_5$, $Ta_2O_5$, $Bi_2O_3$, $Sb_2O_3$, PbO | 0-60 |
| $WO_3$, $MoO_3$ | 0-30 |
| $GeO_2$ | 0-20 |
| MgO, CaO, SrO, BaO | 0-30 |
| $Li_2O$, $Na_2O$, $K_2O$, $Rb_2O$, $Cs_2O$ | 0-12 |
| ZnO, $TiO_2$ | 0-8 |
| Σ $Nb_2O_5$, $Ta_2O_5$, $Bi_2O_3$, $Sb_2O_3$, PbO | 20-60 |
| Σ $WO_3$, $MoO_3$, $GeO_2$ | 0-40 |
| Σ alkali metal oxide | 2-15 |
| Σ alkaline earth metal oxide | 0-30 |

The glasses that can be produced using the method according to the present invention exceptionally preferably comprise the compounds shown in table III.

TABLE III

| Components for Glass Production | |
|---|---|
| Components | Wt.-% |
| $P_2O_5$, $B_2O_3$, $SiO_2$, F | 8-30 |
| $Nb_2O_5$, $Ta_2O_5$, $Bi_2O_3$, $Sb_2O_3$, PbO | 10-50 |
| $WO_3$, $MoO_3$ | 0-30 |
| $GeO_2$ | 0-20 |
| MgO, CaO, SrO, BaO | 0-22 |
| $Li_2O$, $Na_2O$, $K_2O$, $Rb_2O$, $Cs_2O$ | 0-12 |
| ZnO, $TiO_2$ | 0-8 |
| Σ $Nb_2O_5$, $Ta_2O_5$, $Bi_2O_3$, $Sb_2O_3$, PbO | 20-60 |
| Σ $WO_3$, $MoO_3$, $GeO_2$ | 0-40 |
| Σ alkali metal oxide | 2-15 |
| Σ alkaline earth metal oxide | 0-30 |

The glasses that can be produced using the method according to the present invention most exceptionally preferably comprise the compounds shown in table IV.

TABLE IV

| Preferably Components for Glass Production | |
|---|---|
| Components | Wt.-% |
| $P_2O_5$, $B_2O_3$, $SiO_2$, F | 8-30 |
| $Nb_2O_5$, $Ta_2O_5$, $Bi_2O_3$, $Sb_2O_3$, PbO | 10-50 |
| $WO_3$, $MoO_3$ | 0-16 |
| $GeO_2$ | 0-10 |
| MgO, CaO, SrO, BaO | 0-22 |
| $Li_2O$, $Na_2O$, $K_2O$, $Rb_2O$, $Cs_2O$ | 0-12 |

TABLE IV-continued

Preferably Components for Glass Production

| Components | Wt.-% |
|---|---|
| ZnO, TiO$_2$ | 0-8 |
| Σ Nb$_2$O$_5$, Ta$_2$O$_5$, Bi$_2$O$_3$, Sb$_2$O$_3$, PbO | 20-50 |
| Σ WO$_3$, MoO$_3$, GeO$_2$ | 0-20 |
| Σ alkali metal oxide | 2-15 |
| Σ alkaline earth metal oxide | 0-20 |

Preferably the glasses have low contents of silicate and/or noble metals, particularly preferred the glasses are free of silicate and/or noble metals.

EXAMPLES

Examples 1 to 4 describe examples of glass produced according to the present invention and their properties ($n_d$=refractive index; $v_d$=Abbe number; $\Delta P_{g,F}$, $\tau_i$=internal transmittance). The invention is not limited by these concrete examples.

Example 1

A glass of the following composition was produced:
P$_2$O$_5$: 21.0%
ΣNb$_2$O$_5$, Ta$_2$O$_5$, Sb$_2$O$_3$: 50.5%
ΣMgO, CaO, SrO, BaO: 19.0%
ΣLi$_2$O, Na$_2$O, K$_2$O, Rb$_2$O, Cs$_2$O: 4.5%
ΣZnO, TiO$_2$: 5.0%

A melting skull crucible and a fining skull crucible consisting of AlMgSi1, connection segment, homogenization unit, agitator and feeder consisted of PtIr1 were used in the process.

The following melting parameters were used:
Melting: 1200° C.-1210° C., O$_2$-Bubbling: 3×50 l/h
Fining: 1220° C.-1230° C., O$_2$-Bubbling: 2×20 l/h
Mixing: 1180° C.
Feeder: 1150° C.
Ingots were produced.
The following optical values were measured:
$n_d$=1.92773;
$v_d$=20.61;
$\Delta P_{g,F}$=−0.0312
$\tau_i$ (400 nm; 25 mm)=0.104; 0.002[1]; 0.115[2]
$\tau_i$ (420 nm; 25 mm)=0.435; 0.232[1]; 0.495[2]
$\tau_i$ (460 nm; 25 mm)=0.812; 0.748[1]; 0.846[2]
$\tau_i$ (500 nm; 25 mm) 0.898; 0.858[1]; 0.932[2]

The given reference values ([1]) have been measured in a glass of the same composition that has been melted in a melting skull crucible made of AlMgSi1 at 1210° C. and fined in a conventional fining chamber made of PtIr1 at 1230° C. The cooling duct, the homogenization unit, the agitator and the feeder consisted of PtIr1. The reference melt was not bubbled with oxygen.

The given values ([2]) were achieved by additional O$_2$-bubbling through the melt at in other respects identical melting conditions as above. For that purpose the melt was bubbled with oxygen in a mixing crucible with 1×15 l/h at 1175 to 1180° C.

Example 2

A glass of the following composition was produced:
P$_2$O$_5$: 22.8%
ΣNb$_2$O$_5$, Ta$_2$O$_5$, Sb$_2$O$_3$: 47.0%
ΣMoO$_3$, WO$_3$: 14.0%
ΣMgO, CaO, SrO, BaO: 2.0%
ΣLi$_2$O, Na$_2$O, K$_2$O, Rb$_2$O, Cs$_2$O: 9.2%
ΣTiO$_2$, GeO$_2$: 5.0%

A melting skull crucible and a fining skull crucible consisting of AlMgSi1, connection segment, cooling duct, homogenization unit, agitator and feeder consisted of PtIr1 were employed in the process.

The following melting parameters were adjusted:
Melting: 1110° C.-1120° C., O$_2$-Bubbling: 3×30 l/h
Fining: 1130° C.-1150° C., O$_2$-Bubbling: 2×150 l/h
Mixing: 1110-1120° C.
Feeder: 1100° C.
Ingots were produced.
The following optical values were measured:
$n_d$=1.97242;
$v_d$=22.65;
$\Delta P_{g,F}$=0.0223
$\tau_i$ (400 nm; 25 mm)=0.070 (0.06)
$\tau_i$ (420 nm; 25 mm)=0.423 (0.36)
$\tau_i$ (500 nm; 25 mm)=0.875 (0.668)

The reference values given in brackets have been measured in a glass of the same composition that has been melted in a melting skull crucible made of AlMgSi1 at 1120° C. and fined in a conventional fining chamber made of PtIr1 at 1150° C. The cooling duct, the homogenization unit, the agitator and the feeder consisted of PtIr1. The reference melt was not bubbled with 3×30 l/h of oxygen in the melting skull.

Example 3

A glass for optical and electronic purposes of the following composition was produced:
ΣB$_2$O$_3$, SiO$_2$: 10.5%
ΣSb$_2$O$_3$, Bi$_2$O$_3$: 77.0%
ΣMgO, CaO, ZnO: 12.5%

A melting skull crucible, connection segment, cooling duct and feeder consisting of PtIr1 were used.

The following melting parameters were adjusted:
Melting: 1000° C.-1050° C., O$_2$-Bubbling: 3×50 l/h
Cooling track: 900-950° C.
Feeder: 850° C.
Glass flakes were produced.
The following optical values were measured:
$n_d$=2.101

Example 4

An optical glass of the following composition was produced:
SiO$_2$: 29.0%
ΣPbO, Sb$_2$O$_3$: 64.3%
ΣMgO, CaO, SrO, BaO: 2.0%
ΣLi$_2$O, Na$_2$O, K$_2$O, Rb$_2$O, Cs$_2$O: 6.7%

A melting skull crucible and a fining skull crucible consisting of AlMgSi1, connection segment, cooling track, homogenization unit, agitator and feeder consisted of PtIr1 were used.

The following melting parameters were adjusted:
Melting: 1200° C.-1210° C., O$_2$-Bubbling: 3×30 l/h
Fining: 1275° C., O$_2$-Bubbling: 2×20 l/h
Mixing: 1180-1190° C.
Feeder: 1150° C.
Ingots were produced.
The following optical values were measured:
$n_d$=1.75815;
$v_d$=26.64;

$\Delta P_{g,F} = 0.6067$ $\tau_i$ (400 nm; 25 mm) = 0.984

The above-mentioned glass is essentially free of other components. This is supposed to mean in the sense of the present invention that further components are not added to the glass and, if present at all, are present in the form and amount of impurities.

PARTS LIST

1—glass melt
2—melt surface
3—skull walls cooled by cooling agent
4—inductor
5—heatable connection piece made of noble metal or silicate glass
5a—skull connection element
6—cover made of flameproof material
7—heatable or coolable cooling duct made of noble metal or silicate glass
8—heatable homogenization unit made of noble metal or silicate glass
9—agitator made of noble metal or silicate glass
9a—static homogenization unit made of noble metal
10—heatable feeder device made of noble metal or silicate glass
11—bubbling nozzles
12—skull wall cooled by cooling agent (influencing the flow)
13—melt crucible
14—fining vessel

We claim:

1. An apparatus for performing a process of producing glass so that reduction of reduction-sensitive components is avoided or reduced, said apparatus comprising
a metallic skull crucible comprising a melt crucible (13) for a glass melt and a fining vessel (14) connected to the melt crucible (13) to receive the glass melt from the melt crucible (13) when the process of producing glass is performed;
wherein the melt crucible and the fining vessel each comprise walls which are cooled by a cooling agent and which are provided with high-frequency permeable slits;
means for heating the glass melt in the melt crucible and the glass melt in the fining vessel inductively with a high-frequency electromagnetic alternating field;
means for conducting at least one oxidizing agent into the fining vessel, so that the at least one oxidizing agent is introduced into the glass melt in the fining vessel when the process of producing glass is performed; and
means for conducting at least one oxidizing substance into the melt crucible so that said at least one oxidizing substance is introduced into the glass melt in the melt crucible when the process of producing glass is performed.

2. The apparatus according to claim 1, wherein said means for conducting said at least one oxidizing agent into the fining vessel comprises at least one bubbling nozzle (11).

3. The apparatus according to claim 1, wherein said means for conducting said at least one oxidizing agent into the fining vessel comprises foamed, porous or perforated cooled structures.

4. The apparatus according to claim 1, wherein said high-frequency permeable slits have respective slit widths of from 1.5 mm up to and including 4.0 mm.

5. The apparatus according to claim 4, wherein the slit widths are from 2.0 mm up to and including 3.0 mm.

6. The apparatus according to claim 1, wherein the melt crucible comprises coated or uncoated metal or the melt crucible comprises a coated or uncoated metal alloy.

7. The apparatus according to claim 6, wherein the metal or the metal alloy is aluminium alloy, a nickel basis alloy, copper, brass, a noble metal or steel.

8. The apparatus according to claim 6, wherein the metal or the metal alloy is coated with a synthetic material containing fluorine.

9. The apparatus according to claim 1, further comprising a burner supplied with fossil fuels to initiate a glass melting process to form the glass melt.

10. The apparatus according to claim 1, wherein the melt crucible (13) is connected with the fining vessel (14) via a heatable platinum or silicate connection piece (5) through which the glass melt is transferred from the melt crucible into the fining vessel.

11. The apparatus according to claim 1, wherein the melt crucible (13) is connected with the fining vessel (14) via a skull connection element (5a) through which the glass melt is transferred from the melt crucible into the fining vessel.

12. The apparatus according to claim 1, further comprising a homogenization unit (8) connected to the fining vessel (14).

13. The apparatus according to claim 12, wherein the homogenization unit (8) comprises an agitator (9) made of noble metal or silicate glass.

14. The apparatus according to claim 12, wherein the homogenization unit (8) is a static homogenization unit made of noble metal.

* * * * *